UNITED STATES PATENT OFFICE 1,947,294

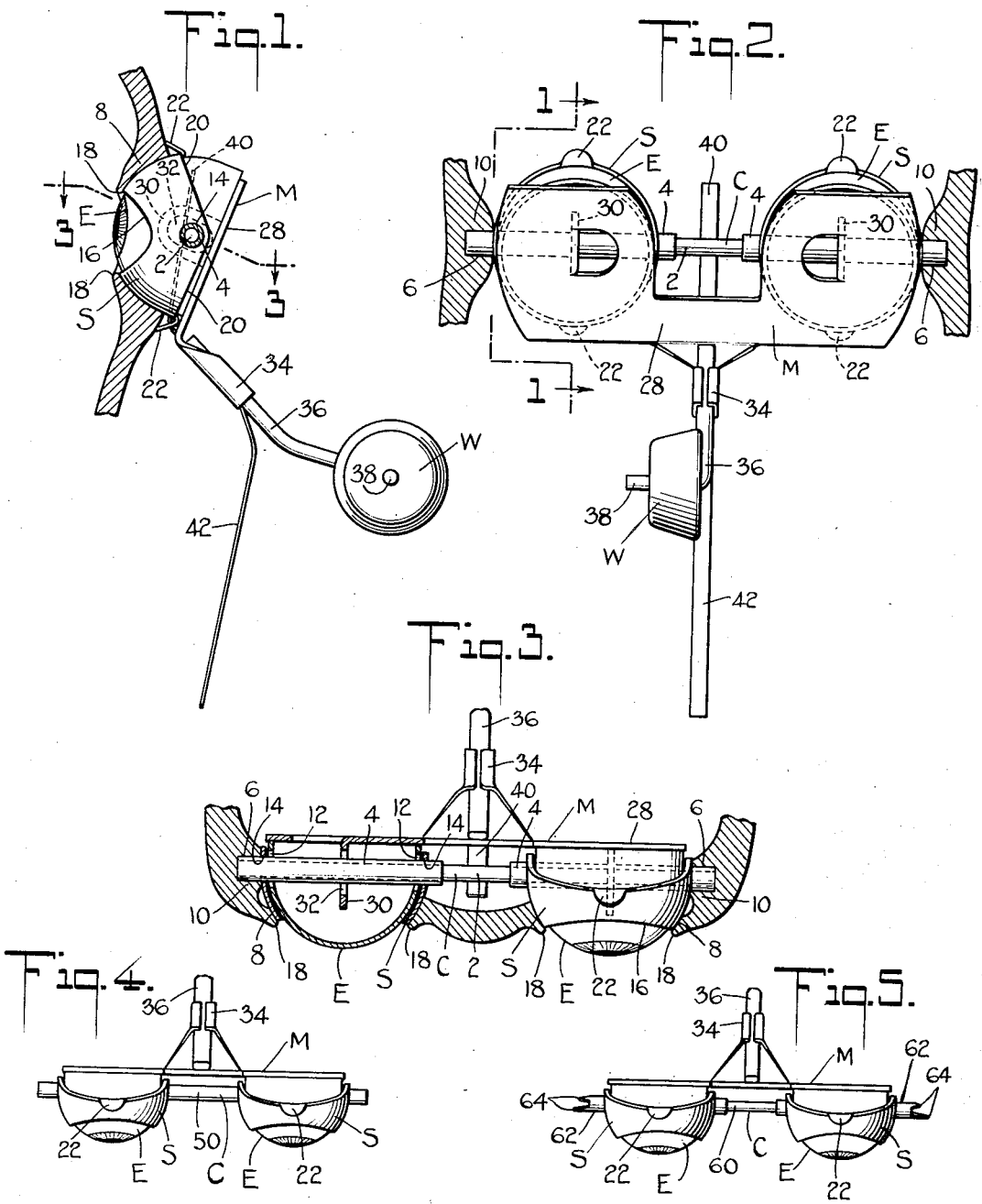

MOVABLE EYE SET FOR DOLLS

Leo J. Grubman, Belle Harbor, N. Y., assignor to Margon Corporation, New York, N. Y., a corporation of New York Application April 16, 1932. Serial No. 605,673

23 Claims. (Cl. 46—40)

This invention relates to dolls, and more particularly to an improved form of movable eye set for dolls, especially for dolls having flexible rubber heads.

As I have explained in greater detail in my copending application Serial No. 605,671, filed concurrently herewith, the problem of providing a rubber doll's head with movable eyes is far more difficult than that met with in the case of a rigid head, because of non-uniformity in dimension due to shrinkage, drying, warping, and the like, and, what is much worse, extreme variations and distortion in shape and dimension permitted during use of the doll by reason of its flexibility. Further difficulty arises when mounting the eye set in a rubber doll's head because it is not feasible to use the ordinary expansible bridge provided with tangs or prongs, first, because the hold is insecure; and secondly, because a slight permitted recession after locating the eye set in the eye openings of the doll's head is wholly insufficient to insure free operation of the eye set, for the workman can so readily push or stretch the yieldable head excessively when applying the same over the eye shells.

To overcome the foregoing difficulties was the general object of my aforesaid copending application, and is one general object of the present invention. Here, as in my copending application, most of these difficulties are overcome by initially molding holding means in the side walls of the doll's head for receiving the ends of the eye set, and by providing the eye set with shell-like socket members surrounding the eye shells and providing clearance therebetween which insures free oscillation of the eye shells regardless of how forcibly the socket members may themselves be pushed into the eye openings of the rubber doll's head.

In my copending application the eye shells and the gravity weight which causes oscillation of the same are fixedly mounted on the cross rod, the oscillation of the weight being transmitted to the eye shells through the cross rod. The ends of the latter are, however, embedded in the side walls of the doll's head, and while I have found the resulting friction to be insufficient to prevent the desired operation of the eye set, it is nevertheless desirable in some cases to minimize this friction and to provide for substantially frictionless operation of the eye set. With this object in view, I have devised and here disclose an eye set in which the cross rod or cross member may remain fixed in location together with the eye socket members; the eye shells, the gravity weight, and the means interconnecting the weight and the eye shells all being loosely mounted on the cross member.

In my copending application the cross rod of the eye set is fixed in length and is difficult to mount in the doll's head unless a special tool is used for the mounting operation, such a tool being disclosed, for example, in a copending application of John H. Wilhelm and the present inventor, Serial No. 605,672, filed concurrently herewith. A further object of my present invention is to dispense with the necessity for using such a special tool, and to make it possible for the doll manufacturer to mount the eye set in a rubber head by means of the same tool used for mounting the eye set in a rigid head. For this purpose, I utilize for the cross member in the present eye set a central rod with a pair of sleeves frictionally mounted thereon, thus providing an extensible cross member which may be expanded within the doll's head by means of an ordinary tool designed for the purpose, in contradistinction to using a non-extensible cross member together with a special tool for stretching or spreading the head.

By reason of the use of socket members as aforesaid, it is unnecessary to provide for recession of the eye set after mounting. However, if a close fit is desired between the socket members and the eye shells, the manufacture of the eye set must be fairly precise, and it is a further object of the present invention to make possible a close fit between the eye shells and socket members, while dispensing with the necessity for precision in manufacture. To accomplish this, I have evolved an eye set which combines the features of socket members for accurately predetermining the effective eye openings in which the eye shells must work, and a permitted recession or transverse movement of the eye shells relative to the cross member, so that the fit between the eye shells and the socket members may be made self-adjustable.

Still another object of the present invention resides in the provision of an improved eye set as aforesaid, which will be applicable to a rigid doll's head as well as to the flexible rubber type of head for which the eye set is more particularly designed.

To the accomplishment of the foregoing and such other objects as may hereinafter appear, my invention consists in the eye set elements and their relation one to the other, as hereinafter are more particularly described in the specification and sought to be defined in the claims. The specification is accompanied by a drawing, in which:

Fig. 1 is a side elevation of an eye set embodying features of the present invention, said elevation being taken in the plane of the line 1—1 in Fig. 1;

Fig. 2 is a rear elevation of the eye set;

Fig. 3 is a partially sectioned plan view of the eye set, the section being taken in the plane of the line 3—3 in Fig. 1;

Fig. 4 is a plan view of a modification using a unitary cross member; and

Fig. 5 is a modification designed for use in a rigid doll's head.

Referring to the drawing, the eye set in each case comprises a cross member C, a pair of eye shells E loosely mounted thereon, a pair of socket members S also mounted on said cross member, a gravity weight W, and means M for interconnecting the weight W and the eye shells E and so designed as to cause oscillation of the eye shells without concomitant oscillation of the cross member C.

Considering the eye set shown in Figs. 1, 2, and 3 in greater detail, the cross member C is made up of a central rod 2 having a pair of sleeves 4 frictionally mounted thereon. The cross member may thus be extended or elongated by forcing the sleeves 4 outwardly on the rod 2, so that the extremities of the sleeves 4 may be forced into mating holes 6 in the side walls of the doll's head.

The doll's head may, for example, be a flexible doll's head made of rubber. The rubber may be partially vulcanized in order to make the same self-supporting in shape, while at the same time retaining a desirable flexibility or yieldability of the material of the head so as to more closely simulate natural flesh. Such a head is not adapted to receive prongs or similar mounting means, and at the same time requires a secure mounting because of the distortion which the head may undergo in use. In accordance with one feature of the present invention, the head as initially molded is provided not only with the regular eye openings 8, but is further provided with the mounting means, specifically the holes 6, in the side walls of the head immediately adjacent the eye openings 8. The head is preferably thickened, as is indicated at 10, so that the holes 6 may be made of ample depth to insure a secure mounting for the eye set.

The eye shells E are generally hemispherical in shape and are preferably loosely mounted on the cross member, and, more specifically, on the sleeves 4, by means of apertures 12 in the side walls of the eye shells. The socket members S are in the form of a segment of a sphere and are also mounted on the cross member C, and, more specifically, the sleeves 4, by means of mating apertures 14 cut through the side walls of the socket members S. The front portion of each socket member is cut away, as is indicated at 16, to expose the eye shell E. The opening 16 is made at least coextensive with the eye opening 8 in the doll's head, and preferably is made slightly larger than the eye opening so that the metallic edge of the socket member will be concealed by the resulting overhanging edge 18 of the eye opening. The overhang of the edge 18 is preferably made sufficient to conceal the metallic edge of the socket member, and yet insufficient to permit the rubber material to bear directly against the eye shell E, even though the eye set is pushed rather forcibly into the eye opening.

The rear edge of the socket member S is cut away, as is indicated most clearly by the lines 20 in Fig. 1, thus providing clearance for free oscillation of the interconnecting means or back plate M. Metallic tabs 22 may be formed integrally from the material of the socket member and bent outwardly to engage the inner surface of the doll's head, thus preventing any possibility of movement or oscillation of the socket member. Two such tabs are provided in this case, one extending upwardly from the top edge of the socket member, and the other downwardly from the bottom edge of the socket member, the construction of these tabs being evident from an inspection of the drawing.

The interconnecting means M preferably comprises a generally flat sheet or plate of metal 28 which bears directly against the rear edges of the eye shells E and which may be suspended from the cross member C. This desired suspension may be most readily provided by striking a pair of forwardly extending lugs 30 from the material of the back plate, these lugs being located at or within the eye shells and being provided with apertures 32 for receiving the cross member C. The plate thus tends to cause simultaneous oscillation of the eye shells, and yet does not interfere with a self-adjustable movement or reciprocation of the eye shells on the cross member.

At its lower edge the plate 28 is extended downwardly and rolled upwardly to form a clamp or sleeve 34 which is compressed upon a pendulum or weight arm 36 the lower end 38 of which is bent at right angles and has driven thereon the weight W.

As so far described, it will be evident that the holes 6 in the side walls of the doll's head may be located nearer the eye openings 8 than the theoretically correct amount, this resulting in a pressure by the socket members S against the eye openings, all of which tends to improve the solidity and security of the mounting of the eye set in the head, without at the same time in any way interfering with the desirable free and frictionless oscillation of the eye shells. The socket members S which are pressed tightly into engagement with the eye openings need not and, in fact, are purposely prevented from moving once the eye set is mounted in position, although a free self-adjusting movement of the socket members on the cross member is permitted as the eye set is being set into place. Similarly, the cross member C, the ends of which are frictionally bound in the holes 6, need not oscillate. Instead, the eye shells E, the back plate M, and the weight W are all freely suspended from and oscillatable upon the stationary cross member C. The necessary clearance between the eye shells E and the socket members S is provided by reason of their difference in dimension, the radius of curvature of the inside of the socket members being slightly larger than the radius of curvature of the outside of the eye shells.

However, in order to avoid the necessity for precision in dimensions when manufacturing the parts of the eye set, and in order to insure a free and smooth movement of the eye shells within the socket members, a resilient self-adjustable relation may, if desired, be established between the eye shells and the socket members, and such an improvement is further illustrated in Figs. 1 through 3 of the drawing. With this object in view, the apertures 12 in the side walls of the eye shells E are made larger than the sleeves 4, and preferably are made in slot formation so as to permit transverse movement of the eye shells relative to the cross member. Thus, in Fig. 3, it will be observed that the openings 12 provide considerable clearance for movement of the eye shell toward and from the eye openings in doll's head. Similarly, the aperture 32 in the lug 30 of the back plate is also slotted to permit of transverse movement of the back plate relative to the cross member, this construction being clearly shown in Figs. 1 and 3 of the drawing. The apertures 14 of the socket members, however, are preferably designed to accurately fit the sleeves 4 so as to establish a definite relationship between the cross member and the socket members. With this construction the movable or oscillatable part of the eye set may move toward or from the socket members and thus provide for a self-adjustment of the eye shells in the socket members.

In order to keep the eye shells in close or frictional contact with the socket members, a spring 40 is preferably provided for urging the oscillatable part of the eye set forwardly of the cross member C, that is, in the direction of the front wall of the doll's head. The spring 40 is preferably a long ribbon-like strip of resilient metal, an intermediate portion of which is secured between the weight arm 36 and the clamp 34 of the back plate, as is best shown in Fig. 1. The upwardly extending portion 40 of the spring passes in front of and bears against the rod 2 of the cross member. This spring urges the cross member toward the back plate, or, in effect, by reaction urges the back plate and consequently the eye shells forwardly into the eye openings. The lower end of the spring may, if desired, be extended downwardly and forwardly, as is indicated at 42, in order to form a resilient stop arm which bears against the front wall of the doll's head and limits the opening movement of the eye set.

A modified and simplified form of eye set is illustrated in Fig. 4, referring to which it may briefly be pointed out that the cross member C in this case consists simply of a unitary or integral rod or tube 50 comparable with the sleeves 4 in the modification already described. With this construction it is necessary to force the eye set into place in the rubber head by stretching the side walls of the head apart sufficiently to receive the projecting ends of the cross member. In this respect the eye set now being described is similar to that disclosed in my copending application Serial No. 605,671, filed concurrently herewith, to which I have already referred. Furthermore, instead of forcing such an eye set into the doll's head manually, the operation may, if desired, be greatly facilitated and quickened by the use of a special mounting tool such as is described in the copending application of John H. Wilhelm and myself, Serial No. 605,672, filed concurrently herewith, to which I have already referred. The eye set of Fig. 4, however, unlike those considered in the copending application referred to, is arranged so that the cross member C as well as the socket members S may be locked and held stationary in the doll's head, the weight, the back plate M, and the eye shells E all being freely oscillatable on the cross member C.

The eye set shown in Fig. 4 also differs from that shown in Figs. 1 through 3, in that the spring 40 and stop 42 have been omitted. In this simplified case, as has already been explained, the desired clearance between the eye shells E and the socket members S is obtained by reason of the difference in dimension or curvature of the fixed and movable members. The movable parts of the eye set are, of course, preferably provided with mating apertures rather than elongated slots for receiving the cross member C. Self-adjustment of the eye shells and socket members along the cross member is had with the present modification just as in the first form described.

At this point it may not be amiss to point out that if desired a stop for limiting the opening movement of the eyes may be provided by the relationship between the back plate M and the stationary socket members S. Thus, referring to Fig. 1, it will be evident that even if the depending stop spring 42 is omitted, the opening movement of the eye shells may be limited by reason of the lower portion of the back plate M bearing against the lower portion of the socket member S, and more particularly against the junction point between the lower tab 22 and the socket member. When the spring 40, 42 is omitted, as in the case of Fig. 4, the socket member may be purposely appropriately dimensioned to obtain this desired limiting action.

Still another form of the invention is shown in Fig. 5. This modification is similar to that first described, in that the cross member C is made up of a central rod 60 and a pair of sleeve members 62 frictionally mounted and outwardly extensible thereon. In the present case, however, the ends of the sleeves 62 are provided with prongs or tangs 64 which may be embedded into the side walls of a doll's head of the rigid type ordinarily made from baked wood flour. The eye set is otherwise similar to that shown in Fig. 4, that is, it has been simplified by the omission of the resilient means 40 for permitting self-adjustment of the eye shells E within the socket members S.

With this arrangement it is evident that the eye set may be mounted within a rigid doll's head by pressing the eye openings of the head tightly against the socket members S, and then operating an appropriate tool to expand or extend the cross member C so as to drive the prongs 64 into the side walls of the head. No provision is needed for recession of the eye shells, the necessary clearance being provided between the eye shells and the accompanying socket members S forming a part of the eye set. This simplifies the eye set. Furthermore, the mounting tool may be simplified, for no means is needed to block up or hold the eye shells in predetermined relation to the cross member during the mounting operation.

It will be understood that the form of the invention shown in Fig. 4, using a one-piece cross member 50, may, if desired, be provided with slots 12, 32 and cooperating resilient means 40 such as was described in connection with Figs. 1 through 3 of the drawing. The same applies to Fig. 5 of the drawing, but in this case much of the advantage of using the socket members S would be lost. The situation in the case of a rigid head is quite different from that in the case of a flexible or rubber head in connection with which the socket members S are practically essential, even with recession, if smooth and satisfactory operation of the eye set is to be assured.

It is believed that the mode of constructing and using the improved eye set of my invention and of combining the same with a flexible or rubber doll's head, as well as the many advantages thereof, will, for the most part, be apparent from the foregoing detailed description. The eye set provides smooth and frictionless operation even when mounted in a flexible head. A secure mounting of the eye set in the rubber head is obtained, and the eye set may be clamped tightly between the eye openings on the one hand, and the mounting openings on the other hand, without at the same time introducing any friction against oscillation of the eye shells. The eye set when in the form shown in Fig. 4 may be mounted in the head either manually or by the use of a special tool, and once mounted in the head is frictionless in operation, the desired oscillation of the eye shells not being retarded even by frictional pressure on the ends of the cross member. When the eye set is provided with a compound or extensible cross member, as in Figs. 1 through 3 of the drawing, it may be mounted in the head without stretching the head and without using a special tool, for the regular tool ordinarily used to expand the cross member may similarly be used in the present case to expand the cross member into the receptive mounting means. The form of the invention shown in Figs. 1 through 3 furthermore provides for a resilient or self-adjusting fit between the eye shells and the socket members, so that there will be no noticeable space or gap therebetween, and at the same time there will be no necessity for precision in manufacturing the parts of the eye set. The opening movement of the eye shells in any of the eye sets may be controlled by appropriate stop means, as, for example, a special spring member, or, if desired, a proper correlation of the dimension of the movable and stationary parts of the eye set. The metallic edges of the socket members may be concealed by the rubber material of the doll's head, and the socket members may be prevented from moving not only by reason of their tight frictional engagement with the eye openings in the doll's head, but also by the provision of special tabs or stop means which bear against the inner wall of the head.

The eye set may be applied to a rigid doll's head as well as to a flexible head, and in such case an accurate fit and smooth operation of the eye shells within the eye sockets are insured by reason of the provision of special eye socket members as a part of the eye set itself. With this construction the eye set may be pressed against the eye openings in the doll's head as tightly as desired before locking or embedding the eye set in place, without danger of binding of the oscillatable eye shells.

It will be apparent that while I have shown and described my invention in preferred forms, many changes and modifications may be made in the structures disclosed, without departing from the spirit of the invention, defined in the following claims.

I claim:

1. An eye set adapted to be subsequently inserted and mounted in a doll head, said eye set comprising a cross member, a pair of eye shells loosely mounted thereon, a pair of eye socket members surrounding said eye shells and also mounted on said cross member, a gravity weight for operating said eye shells, and means loosely mounted on said cross member and connected to said weight for engaging and causing oscillation of the eye shells.

2. An eye set adapted to be subsequently inserted and mounted in a doll head, said eye set comprising a cross member, a pair of eye shells loosely mounted thereon, a pair of eye socket members surrounding said eye shells and also mounted on said cross member, a gravity weight for operating said eye shells, and means loosely mounted on said cross member and connected to said weight for engaging and causing simultaneous oscillation of the eye shells, the rear edges of the socket members being cut away to permit oscillation of the engaging means without oscillation of the socket members.

3. An eye set adapted to be subsequently inserted and mounted in a doll head, said eye set comprising a cross member, a pair of eye shells loosely mounted thereon, a pair of eye socket members surrounding said eye shells and mounted on said cross member, and means for engaging and causing oscillation of the eye shells without oscillating said cross member, the socket members being larger than the eye shells to insure ample clearance for free oscillation of the eye shells.

4. An eye set adapted to be subsequently inserted and mounted in a doll head, said eye set comprising a cross member, a pair of eye shells loosely mounted thereon, a pair of eye socket members surrounding said eye shells and also mounted on said cross member, a gravity weight for operating said eye shells, and means loosely mounted on said cross member connected to said weight for engaging the rear edges of and causing simultaneous oscillation of the eye shells without oscillating the socket members or the cross member, the socket members being larger than the eye shells and being cut away to permit free oscillation of the eye shells and the aforesaid engaging means.

5. A doll's eye set adapted to be subsequently inserted and mounted in a doll head, said eye set comprising a cross member, a pair of eye shells loosely mounted on said cross member, a pair of eye socket members surrounding said eye shells and mounted on said cross member, a back plate engaging the rear edges of said eye shells and having forwardly extending lugs for loosely receiving the cross member, and a gravity weight depending from said back plate.

6. A doll's eye set adapted to be subsequently inserted and mounted in a doll head, said eye set comprising a cross member, a pair of eye shells loosely mounted on said cross member and adapted for limited movement transversely thereof, a pair of eye socket members surrounding said eye shells and mounted on said cross member, a back plate engaging the rear edges of said eye shells and having forwardly extending lugs provided with slots for loosely receiving the cross member and permitting transverse movement relative thereto, and a gravity weight depending from said back plate.

7. A doll's eye set adapted to be subsequently inserted and mounted in a doll head, said eye set comprising a cross member, a pair of eye shells loosely mounted on said cross member and adapted for limited movement transversely thereof, a pair of eye socket members surrounding said eye shells and mounted on said cross member, a back plate engaging the rear edges of said eye shells and mounted on said cross member and adapted for limited movement transversely thereof, and a gravity weight depending from said back plate, the rear edges of said socket members being cut away to permit oscillation of said back plate.

8. A doll's eye set comprising a cross member, a pair of eye shells loosely mounted on said cross rod, a pair of eye socket members surrounding said eye shells and mounted on said cross member, a back plate engaging the rear edges of said eye shells and loosely mounted on said cross member, the rear edges of said socket members being cut away to permit oscillation of said back plate and being provided with outwardly extending tabs for bearing against the inner wall of the doll's head in order to prevent movement of the socket members, and a gravity weight depending from said back plate for causing oscillation of said eye shells.

9. A doll's eye set comprising a cross member, a pair of eye shells provided with slots at the sides thereof for loosely receiving the cross member and permitting transverse movement relative thereto, a pair of eye socket members surrounding said eye shells and each provided with opposite side apertures for accurately receiving said cross member, means independent of the socket members for mounting the eye set in a doll's head, a gravity weight for causing oscillation of said eye shells, and means interconnecting said weight and said eye shells.

10. A doll's eye set comprising a cross member, a pair of eye shells provided with slots at the sides thereof for loosely receiving the cross member and permitting transverse movement relative thereto, a pair of eye socket members surrounding said eye shells and each provided with opposite side apertures for accurately receiving said cross member, means independent of the socket members for mounting the eye set in a doll's head, a back plate engaging the rear edges of said eye shells and having forwardly extending lugs provided with slots for loosely receiving the cross member and permitting transverse movement relative thereto, and a gravity weight depending from said back plate for causing oscillation of said eye shells.

11. A doll's eye set comprising a cross member, a pair of eye shells provided with slots at the sides thereof for loosely receiving the cross member and permitting transverse movement relative thereto, a pair of eye socket members surrounding said eye shells and each provided with opposite side apertures for accurately receiving said cross member, means independent of the socket members for mounting the eye set in a doll's head, a back plate engaging the rear edges of said eye shells and having forwardly extending lugs provided with slots for loosely receiving the cross member and permitting transverse movement relative thereto, the rear edges of said socket members being cut away to permit oscillation of said back plate, and a gravity weight depending from said back plate for causing oscillation of said eye shells.

12. A doll's eye set comprising a cross member, a pair of eye shells provided with slots at the sides thereof for loosely receiving the cross member and permitting transverse movement relative thereto, a pair of eye socket members surrounding said eye shells and provided with side apertures for accurately receiving said cross member, a back plate engaging the rear edges of said eye shells and having forwardly extending lugs provided with slots for loosely receiving the cross member and permitting transverse movement relative thereto, the rear edges of said socket members being cut away to permit oscillation of said back plate and being provided with upwardly and downwardly extending tabs for bearing against the inner wall of the doll's head to prevent movement of the socket members, and a gravity weight depending from said back plate for causing oscillation of said eye shells.

13. A doll's eye set adapted to be subsequently inserted and mounted in a doll head, said eye set comprising an expansible cross assembly including a central cross rod and a pair of outwardly reciprocable sleeves frictionally mounted thereon, a pair of eye shells loosely mounted on said cross assembly, a pair of eye socket members surrounding said eye shells and mounted on said cross assembly, a gravity weight, and means interconnecting said weight and said eye shells for causing oscillation thereof.

14. A doll's eye set adapted to be subsequently inserted and mounted in a doll head, said eye set comprising an expansible cross assembly including a central cross rod and a pair of outwardly reciprocable sleeves frictionally mounted thereon, a pair of eye shells loosely mounted on said cross assembly and adapted for limited movement transversely thereof, a pair of eye socket members surrounding said eye shells and mounted on said cross assembly, a back plate engaging the rear edges of said eye shells and having forwardly extending lugs provided with slots for loosely receiving the cross assembly and permitting transverse movement relative thereto, and a gravity weight depending from said back plate.

15. A doll's eye set adapted to be subsequently inserted and mounted in a doll head, said eye set comprising an expansible cross assembly including a central cross rod and a pair of outwardly reciprocable sleeves frictionally mounted thereon, a pair of eye shells loosely mounted on said cross assembly and adapted for limited movement transversely thereof, a pair of eye socket members surrounding said eye shells and mounted on said cross assembly, a back plate engaging the rear edges of said eye shells and having forwardly extending lugs provided with slots for loosely receiving the cross assembly and permitting transverse movement relative thereto, and a gravity weight depending from said back plate, the outermost ends of said sleeves being provided with a plurality of prongs adapted to be embedded in the side walls of the doll's head.

16. A doll's eye set comprising an expansible cross assembly including a central cross rod and a pair of outwardly reciprocable sleeves frictionally mounted thereon, a pair of eye shells loosely mounted on said cross assembly and adapted for limited movement transversely thereof, a pair of eye socket members surrounding said eye shells and mounted on said cross assembly, a back plate engaging the rear edges of said eye shells and having forwardly extending lugs provided with slots for loosely receiving the cross assembly and permitting transverse movement relative thereto, a gravity weight depending from said back plate, and a spring secured to said back plate and bearing against said cross rod between the aforesaid sleeves.

17. A movable eye set particularly adapted to be mounted in a flexible rubber doll's head which is provided with mounting holes in the side walls of the head, said eye set comprising a cross member consisting of a unitary or solid cross rod or sleeve the ends of which extend a substantial distance beyond the ends of the eye set so as to be received by the aforesaid mounting holes, a pair of eye shells loosely mounted on said cross rod, a pair of eye socket members surrounding said eye shells and mounted on said cross member, a gravity weight, and means loosely mounted on said cross member interconnecting said weight and said eye shells for causing oscillation of said eye shells without oscillating said socket members or cross member.

18. A movable eye set particularly adapted to be mounted in a flexible rubber doll's head which is provided with mounting holes in the side walls of the head, said eye set comprising a cross member consisting of a unitary or solid cross rod or sleeve the ends of which extend a substantial distance beyond the ends of the eye set so as to be received by the aforesaid mounting holes, a pair of eye shells loosely mounted on said cross rod, a pair of eye socket members surrouding said eye shells and mounted on said cross member, a back plate engaging the rear edges of said eye shells and loosely mounted on said cross member, and a gravity weight depending from said back plate for causing oscillation of said eye shells.

19. A movable eye set particularly adapted to be mounted in a flexible rubber doll's head which is provided with mounting holes in the side walls of the head, said eye set comprising a cross member consisting of a unitary or solid cross rod or sleeve the ends of which extend a substantial distance beyond the ends of the eye set so as to be received by the aforesaid mounting holes, a pair of eye shells provided with slots at the sides thereof for loosely receiving the cross rod and permitting transverse movement relative thereto, a pair of eye socket members surrounding said eye shells and provided with side apertures for accurately receiving said cross member, a back plate engaging the rear edges of said eye shells and having forwardly extending lugs provided with slots for loosely receiving the cross member and permitting transverse movement relative thereto, the rear edges of said socket members being cut away to permit oscillation of said back plate and being provided with outwardly extending tabs for bearing against the inner wall of the doll's head in order to prevent movement of the socket members, and a gravity weight depending from said back plate for causing oscillation of said eye shells.

20. A doll comprising a relatively flexible rubber head provided with eye openings and mounting holes in the side walls of the head near the eye openings, and an eye set including an expansible cross assembly having a central cross rod and a pair of sleeves frictionally mounted thereon and projecting into the aforesaid mounting holes, a pair of eye shells mounted on said cross assembly, a pair of eye socket members surrounding said eye shells and held against the eye openings in the head, a gravity weight, and means interconnecting the weight and the eye shells, said socket members insuring clearance for the eye shells despite deformation of the rubber head.

21. A doll comprising a relatively flexible rubber head provided with eye openings and mounting holes in the side walls of the head near the eye openings, and an eye set including a cross member the ends of which project into the aforesaid mounting holes, a pair of eye shells loosely mounted on said cross member, a pair of eye socket members surrounding said eye shells and held tightly against the eye openings in the head, a gravity weight, and means so interconnecting the weight and the eye shells as to cause oscillation of the eye shells without oscillating the cross member, said socket members insuring clearance for the eye shells despite deformation of the rubber head.

22. A doll comprising a relatively flexible rubber head provided with eye openings and mounting holes in the side walls of the head near the eye openings, and an eye set including an expansible cross assembly having a central cross rod and a pair of sleeves frictionally mounted thereon and projecting into the aforesaid mounting holes, a pair of eye shells loosely mounted on said cross assembly, a pair of eye socket members surrounding said eye shells and held by the cross assembly against the eye openings in the head, a gravity weight, and means so interconnecting the weight and the eye shells as to cause oscillation of the eye shells without oscillating the cross assembly.

23. A doll comprising a relatively flexible rubber head provided with eye openings and mounting holes in the side walls of the head near the eye openings, and an eye set including an expansible cross assembly having a central cross rod and a pair of sleeves frictionally mounted thereon and projecting into the aforesaid mounting holes, a pair of eye shells loosely mounted on said cross assembly, a pair of eye socket members surrounding said eye shells and also mounted on said cross assembly, a back plate engaging the rear edges of said eye shells and loosely mounted on said cross assembly, and a gravity weight depending from said back plate, the rear edges of the socket members being cut away to permit oscillation of the back plate, and being provided with outwardly extending tabs bearing against the inner wall of the doll's head.

LEO J. GRUBMAN.